United States Patent Office 3,467,650
Patented Sept. 16, 1969

3,467,650
**3 - CHLORO - 5 - (α - DIMETHYLAMINOPROPYL)-
IMINODIBENZYL AND ITS ACID ADDITION
SALTS**
Walter Schindler, Riehen, near Basel, Switzerland, and
Henri Dietrich, Birsfelden, near Basel, Switzerland, assignors to Geigy Chemical Corporation, Ardsley, N.Y.,
a corporation of Delaware
No Drawing. Filed Dec. 4, 1959, Ser. No. 857,274
Claims priority, application Switzerland, Dec. 6, 1958,
67,046/58, 67,049/58; Jan. 12, 1959, 68,201/59
Int. Cl. C07d 41/08; A61k 27/00
U.S. Cl. 260—239         3 Claims The present invention concerns new N-heterocyclic compounds having valuable pharmacological properties, as well as processes for the production thereof.

10.11-dihydro-5H - dibenzo[b.f.]azepines and 5H-dibenzo[b.f.]azepines monoalkylated or halogenated in an aromatic ring as well as derivatives thereof have not been known up to now. It has now been found that N-derivatives of such compounds corresponding to the general formula

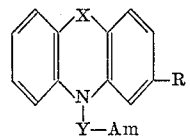

wherein:

X represents a member selected from the group consisting of the ethylene radical —CH$_2$—CH$_2$— and the vinylene radical —CH=CH—, R represents a member selected from the group consisting of the ethyl radical, the propyl radical, chlorine and bromine, Y represents an alkylene radical with 2–3 carbon atoms, and Am represents a member selected from the group consisting of a lower dialkylamino group, the pyrrolidino, piperidino, morpholino and N - methyl-piperidyl(2)-group have valuable pharmacological properties, in particular antiallergic, sedative, spasmolytic, serotonin antagonistic, antiemetic and adrenolytic activity; for example they also restrict the saliva secretions caused by pilocarpine. These substances can be administered perorally and, possibly, also subcutaneously among other purposes for the treatment of certain forms of mental disorders, in particular depressions, for the treatment of allergic rhinitis as well as to potentiate the action of other pharmaceuticals, in particular, anaesthetics. Of the compounds according to the invention, the ones of particular value are those in which R is general Formula I is chlorine.

Quaternary ammonium salts which are derived from the tertiary bases defined above have gangliophlegic activity.

The new compounds are produced by reacting a 3-alkyl- or 3-halogen-10.11-dihydro-5H-dibenzo[b.f.]azepine or a 3-alkyl- or 3-halogen-5H-dibenzo[b.f.]azepin corresponding to the general formula

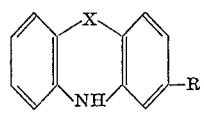

which in the following will be termed 3-alkyl- or 3-halogen-iminodibenzyls or 3-alkyl- or 3-halogen-iminostilbenes respectively, with a reactive ester of an amino alcohol of the general formula HO—Y—Am  III wherein R, X, Y and Am have the meanings given above, the reaction being performed in the presence of a condensing agent.

Suitable condensing agents are, in particular, sodium amide, lithium amide, potassium amide, sodium or potassium, butyl lithium, phenyl lithium, sodium hydride or lithium hydride. The reaction can be performed in the presence or absence of an inert organic solvent, as examples of which can be named benzene, toluene and xylenes.

As reactive esters of amino alcohols of the general Formula III, in particular the halides are used; individually can be named: dimethylaminoethyl chloride, diethylaminoethyl chloride, methylethylaminoethyl chlordie, β-dimethylamino propyl chloride, β-dimethylamino-isopropyl chloride, γ-dimethylamino-propyl chloride, β-(di-n-propylamino)-ethyl chloride, β-(methyl-isopropylamino) - ethyl chloride, β-(di-n-butylamino) - ethyl chloride, β-(diisobutyl-amino)-ethyl chloride, pyrrolidino-ethyl chloride, piperidinoethyl chloride, γ-piperidino-propyl chloride, morpholino-ethyl chloride and N-methyl-piperidyl(2)-methyl chloride as well as the corresponding bromides and iodides.

Examples of starting materials of the general Formula II which are suitable for the reaction are 3-ethyl-iminodibenzyl, 3-n-propyl-iminodibenzyl, 3-ethyl-iminostilbene, 3-chloro- and 3-bromo-iminodibenzyl and iminostilbene. The iminodibenzyl derivatives named above are obtained from unsubstituted iminodibenzyl by N-acylation, reaction with suitable acid halides according to Friedel-Crafts, hydrolysis and then reduction of the 3-acyl compounds according to Wolff-Kishner, or by N-acylation, reaction with acetyl chloride according to Friedel-Crafts, treatment with hydrazoic acid according to Schmidt, partial hydrolysis of the 3-acetamido-5-acyl-iminodibenzyl obtained, diazotisation of the 3-amino-5-acyl compounds, reaction of the diazonium halides with cupric halides according to Sandmeyer and hydrolytic splitting off of the 5-acyl radical. The iminostilbene derivatives can be obtained from the corresponding 5-acyl-iminodibenzyl derivatives by halogenation in the 10-position, e.g. with N-bromosuccinimide, splitting off hydrogen halide and hydrolysis, for example with caustic alkalies in the cold.

The new N-heterocyclic compounds of the general Formula I are obtained by a further process in which a compound of the general formula

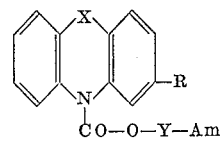

wherein R, X, Y and Am have the meanings given above, is heated until one mol of carbon dioxide is split off. The compounds of the general Formula IV are produced in their turn, for example, by reacting phosgene with a compound of the general formula II and reacting the resultant 3-alkyl- or 3-halogen-5-chlorocarbonyliminodibenzyl or -iminostilbene with an amino alcohol of the general Formula III.

A third variation of the process for the production of compounds of the general Formula I consists in reacting a reactive ester of a compound of the general formula

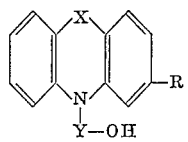

wherein R, X and Y have the meanings given above, in particular a halide, with a secondary amine of the general formula Am—H                  VI wherein R, X, Y and Am have the meanings given above but naturally there being no linkage between an alkyl radical of Am and Y. The reaction can be performed for example at a moderately raised temperature of, e.g. 80–120° in an inert solvent such as, e.g. a low molecular alkanol or alkanone. Advantageously an excess of the amine used in the reaction is used as acid binding agent. Sometimes, the reaction is performed in a closed vessel; this depends on the boiling point of the amine and of the solvent used and also on the temperature necessary to perform the reaction. Reactive esters of compounds of the general Formula V are obtained for example by reacting alkali metal compounds of iminodibenzyl or of iminostilbene compounds of the general Formula II with alkylene oxides and reacting the hydroxyalkyl derivatives obtained with inorganic acid halides, methane sulphonic acid chloride or aryl sulphonic acid chlorides. 5-halogen alkyl-iminodibenzyls, 5 - methane sulphonyloxy-alkyl-iminodibenzyls, 5 - arylsulphonyloxyalkyl-iminodibenzyls or the corresponding iminostilbene derivatives are then obtained. These can be reacted, for example, with dimethylamine, methylethylamine, diethylamine, pyrrolidine, piperidine or morpholine.

Compounds of the general Formula I are obtained by a further process in which a compound of the general Formula

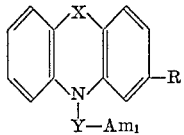

wherein $Am_1$ represents the primary amino group or a monoalkylamino group and X, R and Y have the meanings given above, is treated with a low molecular alkylating agent. Starting materials of the general Formula VII are obtained, for example, if ammonia or a low molecular monoalkylamino is reacted analogously to the previous process instead of a secondary amine of the general Formula VI, with a reactive ester of a compound of the general Formula V or also if, for example, a 3-alkyl- or 3-alkyl- or 3-halogen- 5 - cyanoalkyl iminodibenzyl or iminostilbene is reduced or hydrogenated. Examples of low molecular alkylating agents are dimethyl sulphate, diethyl sulphate, methyl iodide, ethyl iodide, ethyl bromide, n-propyl bromide and p-toluene sulphonic acid methyl ester in the presence of acid binding agents such as, e.g. sodium or potassium carbonate, and of an inert organic solvent. Also, for example, formaldehyde in the presence of formic acid can be used.

Finally, compounds of the general Formula I can also be produced by reacting compounds of the general formula

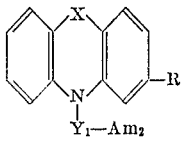

wherein:

$Y_1$ and $Am_2$ represent radicals corresponding to the definitions given for Y and Am above but in one of the two radicals, at least one methylene group bound to a nitrogen atom is replaced by a carbonyl group —CO—, and X and R have the meanings given above, with an alkali metal-earth metal hydride, in particular with lithium-aluminium hydride. This process is of importance particularly for the production of N'.N' - disubstituted 3-alkyl- or 3-halogen-5-(α-aminomethyl-alkyl)-iminodibenzyls or -iminostilbenes because these compounds can be obtained, for example, by the first process only with the isomeric N'.N'-disubstituted 3-alkyl- or 3-halogen-5-(β-aminoalkyl)-iminodibenzyls or -iminostilbenes formed by molecular rearrangement. The N'.N'-disubstituted 3-alkyl- or 3-halogen-5-(α-carbamyl-alkyl)-iminodibenzyls or -iminostilbenes necessary for the production of the above compounds are obtained, for example, by reaction of alkali metal compounds of 3-alkyl- or 3-halogen-iminodibenzyls or -iminostilbenes of the general Formula II with low molecular α-bromo-alkane carboxylic acid dialkylamides, pyrrolidides, piperidides or morpholides. Further starting materials of the general formula VIII are, for example, the 3-alkyl- or 3-halogen-substituted 5 - (dialkylamino-alkanoyl)-, 5-(piperidino-alkanoyl)-, 5-(N'-alkyl-alkanoylamino-alkyl)-, 5-(N'.N'-dialkanoyl-aminoalkyl)-, 5-succinimidoalkyl- and 5-glutarimidoalkyl-iminodibenzyls and -iminostibenes. The 5-dialkylaminoalkanoyl compounds are obtained, for example, by reacting alkali metal compounds of 3-alkyl- or 3-halogen iminodibenzyls or -iminostilbenes of the general Formula II with halogen alkane carboxylic acid halides and then reacting the 5-halogen alkanoyl compounds obtained with suitable amines of the general Formula VI. The other starting materials mentioned above are obtained, for example, by reacting reactive esters of compounds of the general Formula V with alkali metal compounds of alkane carboxylic acid-N-alkylamides, succinimide or glutarimide, or by acylating 3-alkyl- or 3-halogen-5-monoalkylaminoalkyl or 3-alkyl- or 3-halogen-5-aminoalkyl iminodibenzyls or iminostilbenes of the general Formula VII.

Monoquaternary ammonium compounds are obtained from the tertiary amines of the general Formula I in the usual way by adding reactive esters, in particular halides or sulphates of aliphatic or araliphatic alcohols, e.g., methyl iodide, dimethyl sulphate, ethyl bromide, ethyl iodide or benzyl chloride. In this addition, the group Am reacts.

The tertiary bases form salts, some of which are water soluble with inorganic or organic acids such as hydrochloric acid, hydrobromic acid, sulphuric acid, phosphoric acid, methane sulphonic acid, ethane disulphonic acid, acetic acid, citric acid, malic acid, succinic acid, fumaric acid, maleic acid, tartaric aid, benzoic acid and phthalic acid.

The folowing examples further illustrate the production of the new compounds. Parts are given therein as parts by weight, their relationship to parts by volume is as that of grammes to cubic centimetres. The temperatures are in degree centigrade.

EXAMPLE 1

10 parts of 3-ethyl-iminodibenzyl are dissolved in 50 parts by volume of anhydrous benzene and a solution of the base liberated from 9 parts of pyrrolidinoethyl chloride-hydrochloride in 150 parts by volume of anhydrous benzene is added. A suspension of 2.2 parts of sodium amide in toluene is added dropwise at 50° while stirring and then the reaction mixture is refluxed for 16 hours. It is then cooled and water is added. The benzene phase is separated and extracted with 2 N-hydrochloric acid; the hydrochloric acid extract is made alkaline with diluted caustic soda lye and extracted with ether. The ether solution is concentrated and the residue is distilled in a high vacuum whereupon the 3-ethyl-5-(β-pyrrolidinoethyl)-iminodibenzyl passes over at 164° under 0.005 mm.

pressure. On treating with ethereal hydrogen chloride solution, the hydrochloride of the base named is obtained which, after recrystallisation from acetone/ether melts at 156–158°.

The same compound is obtained if the 3-ethyl-iminodibenzyl is reacted with pyrrolidino-ethyl bromide in the presence of lithium amide instead of with pyrrolidino-ethyl chloride in the presence of sodium amide.

In an analogous manner, on using the base liberated from 8 parts of dimethylaminoethyl chloride-hydrochloride, 3-ethyl-5-($\beta$-dimethylamino-ethyl)-iminodibenzyl- (B.P.$_{0.005}$ 145–147°) is obtained.

Also in an analogous manner, starting from 10.7 parts of 3-n-propyl-iminodibenzyl and the base liberated from 8.5 parts of $\gamma$-dimethylaminopropyl chloride-hydrochloride, 3-n-propyl-5-($\gamma$-dimethylamino-propyl)-iminodibenzyl B.P.$_{0.001}$ 142–144° is obtained and also, starting from 9.9 parts of 3-ethyl-iminostilbene and the base liberated from 8.5 parts of $\gamma$-dimethylaminopropyl chloride-hydrochloride, 3-ethyl-5-($\gamma$-dimethylamino-propyl)-iminostilbene B.P.$_{0.004}$ 152° is obtained.

EXAMPLE 2

22.9 parts of 3-chloro-iminodibenzyl are dissolved in 300 parts by volume of xylene and 4 parts of sodium amide, pulverised and suspended in toluene, are added while stirring in a nitrogen atmosphere. The xylene solution immediately becomes dark coloured but on the sodium salt crystallising out it becomes light coloured again. The reaction mixture is stirred for about 2 hours at 80° until the development of ammonia has ended. A solution of $\gamma$-dimethylamino-propyl chloride (liberated from 17.4 parts of hydrochloride with caustic soda lye, i.e., about 10% excess, taken up in toluene and dried for 2 hours with anhydrous sodium sulphate), in toluene is added to the sodium salt and the whole is stirred under reflux for 15 hours. The precipitated sodium chloride is filtered off and the filtrate is concentrated. The residue is diluted with ether, and the hydrochloride of 5-($\gamma$-dimethylaminopropyl)-3-chloro-iminodibenzyl is precipitated by introducing anhydrous hydrochloric acid. It is filtered off under suction and purified by repeated recrystallisation from acetone whereupon it melts at 191.5–192°.

In an analogous manner, on using the base liberated from 17.4 parts of $\gamma$-diethylamino-propyl chloride-hydrochloride, 5-($\gamma$-diethylaminopropyl)-3-chloro-iminodibenzyl is obtained, and on using the base liberated from 20.5 parts of $\beta$-piperidino-ethyl chloride-hydrochloride, 5-($\beta$-piperidino-ethyl)-3-chloro-iminodibenzyl is obtained. On the other hand, starting from 27.4 parts of 3-bromo-iminodibenzyl, 5-($\gamma$-dimethylamino-propyl)-3-bromo-iminodibenzyl is obtained analogously to the above example.

EXAMPLE 3

23 parts of 3-chloro-iminodibenzyl are dissolved in 190 parts by volume of xylene, 4.3 parts of sodium amide, pulverised and suspended in toluene, are added and the whole is stirred for 3 hours at 80° in a nitrogen atmosphere. The solution becomes dark coloured at first but lightens as soon as thes odium salt begins to crystallise. The morpholino-ethyl chloride solution (liberated from 20.5 parts of hydrochloride with diluted caustic soda lye and taken up in benzene) is added to the sodium salt. The reaction mixture is then refluxed for 16 hours while continuously stirring. After concentrating and cooling, the precipitated sodium chloride is filtered off and washed with anhydrous ether. Anhydrous hydrochloric acid gas is introduced into the solution in the cold. The hydrochloride of 3-chloro-5-($\beta$-morpholino-ethyl)-iminodibenzyl is filtered off under suction and recrystallised from alcohol. It melts at 242°.

EXAMPLE 4

23 parts of 3-chloro-iminodibenzyl are dissolved in 190 parts by volume of xylene, 4.3 parts of sodium amide (pulverised and suspended in toluene) are added and the whole is stirred for 3 hours at 80° in a nitrogen atmosphere. The dimethylaminoisopropyl chloride (liberated from 18 parts of hydrochloride of dimethylamino-isopropyl chloride with diluted caustic soda lye and taken up in benzene, the benzene solution dried for 2 hours with anhydrous sodium sulphate) is then added and the reaction mixture is refluxed for 16 hours while stirring. The precipitated sodium chloride is filtered off, washed with anhydrous ether and the hydrochloride of the 3-chloro-4-($\beta$-dimethylamino-isopropyl)-iminodibenzyl is precipitated from the filtrate by the introduction of anhydrous hydrogen chloride. It is recrystallised from a great deal of acetone and in the pure state melts at 247°.

EXAMPLE 5

8 parts of pyrrolidine are added to a solution of 15 parts of 3-ethyl-5-($\beta$-chlorethyl)-iminodibenzyl in 100 parts by volume of anhydrous benzene and the whole is refluxed for 12 hours. After cooling, the benzene solution is thoroughly washed with water, dried and concentrated. The calculated amount of anhydrous alcoholic hydrochloric acid is added to the residue whereupon the hydrochloride of 3-ethyl-5-($\beta$-pyrrolidino-ethyl)-iminodibenzyl crystallises out. It can be recrystallised as described in Example 1 and then melts at 156–158°.

EXAMPLE 6

10 parts of 3-n-propyl-5-($\gamma$-methylamino-propyl)-iminodibenzyl are dissolved in 7.0 parts by volume of 85% formic acid and 4.5 parts by volume of 30% formalin are added to the solution. The whole is left to stand for 3 hours at room temperature and is then heated for 12 hours on a steam bath. After cooling, the reaction mixture is concentrated in the vacuum, the residue is made alkaline with 30% caustic soda lye and the whole is extracted with ether. After washing and drying, the ether extracts are concentrated and the residue is distilled whereupon the 3-n-propyl-5-($\gamma$-dimethylamino-propyl)-iminodibenzyl is obtained, B.P.$_{0.001}$–142–144°.

EXAMPLE 7

23 parts of 3-chloro-iminodibenzyl and 15 parts of 1-chloro-3-bromo-propane are dissolved in 200 parts by volume of anhydrous benzene. 4.3 parts of sodium amide, pulverised and suspended in toluene, are slowly added dropwise while stirring at 50° and the stirring is then continued for 15 hours at 50–60°. The reaction mixture obtained is poured into water, the benzene phase is separated and dried with sodium sulphate. After concentrating, 3-chloro-5-($\gamma$-chloro-propyl)-iminodibenzyl is obtained as a dark oil which can be further worked up direct.

EXAMPLE 8

23 parts of 3-chloro-iminodibenzyl are dissolved in 150 parts by vol. of anhydrous xylene and 4.3 parts of sodium amide, pulverised and suspended in toluene, are added. The mixture is stirred and heated to 90° whereupon ammonia is developed and the sodium salt is formed. $\beta$-[N-methyl-piperidyl(2)]-ethyl chloride (liberated from 22 parts of the hydrochloride and taken up in toluene) is added to the suspension of the sodium salt obtained and the whole is refluxed for 16 hours. After cooling, the precipitated sodium chloride is separated, the solution is concentrated and the oil is distilled at 0.1 mm. pressure. The 3-chloro-5-[$\beta$-(N'-methyl-piperidyl(2')-ethyl]-imindibenzyl passes over at 195°.

EXAMPLE 9

23 parts of 3-chloro-iminostilbene dissolved in 250 parts by volume of anhydrous xylene, to which 4.3 parts of sodium amide, pulverised and suspended in toluene, are added are refluxed for 3 hours. $\gamma$-dimethylamino-propyl chloride (liberated from 18 parts of the hydrochloride and taken up in xylene) is added and the whole is refluxed for 20 hours while stirring. The reaction mixture obtained is evaporated to dryness, ether is added to the residue and the basic portions are extracted from the ethereal solution with diluted hydrochloric acid. The acid extracts are made alkaline and the free base is dissolved in ether. After drying and concentrating the ether solution, the desired 3-chloro - 5-(γ-dimethylamino-propyl)-iminostilbene is obtained. Recrystallised from petroleum ether it melts at 53°.

What we claim is:
1. 3-chloro-5-(γ-dimethylamino-propyl)-iminodibenzyl.
2. A pharmaceutically acceptable acid addition salt of 3-chloro-5(γ-dimethylamino-propyl)-iminodibenzyl.
3. 3 - chloro-5-(γ-dimethylamino-propyl)-iminodibenzyl hydrochloride.

References Cited
UNITED STATES PATENTS
2,813,857  11/1957  Schindler et al.

FOREIGN PATENTS
200,578  11/1958  Austria.
215,335  6/1958  Australia.

ALTON D. ROLLINS, Primary Examiner

U.S. Cl. X.R.

260—247.2, 247.5, 247.7, 293, 294.3, 294.7, 326.3, 326.5, 326.81